United States Patent [19]
Yamaoka et al.

[11] Patent Number: 5,633,950
[45] Date of Patent: May 27, 1997

[54] METHOD OF IMAGE PROCESSING IN OPTICAL MEASURING APPARATUS

[75] Inventors: Naoji Yamaoka; Koji Oda, both of Sayama, Japan

[73] Assignee: Honda Giken Kogyo Kabushiki Kaisha, Tokyo, Japan

[21] Appl. No.: 362,238

[22] Filed: Dec. 22, 1994

[30] Foreign Application Priority Data

| Dec. 28, 1993 | [JP] | Japan | 5-337616 |
| Dec. 28, 1993 | [JP] | Japan | 5-337617 |
| Dec. 28, 1993 | [JP] | Japan | 5-337618 |
| Dec. 28, 1993 | [JP] | Japan | 5-337619 |

[51] Int. Cl.$^6$ ............................................. G06K 9/00
[52] U.S. Cl. .................. 382/141; 382/152; 382/288; 348/95; 348/135; 356/375
[58] Field of Search ........................... 382/141, 152, 382/202, 288; 356/375, 376, 394; 348/86, 125, 135, 90, 94, 95, 129, 131, 132

[56] References Cited

U.S. PATENT DOCUMENTS

| 4,988,201 | 1/1991 | Sugitani et al. | 348/90 |
| 5,027,416 | 6/1991 | Loriot | 348/88 |
| 5,129,010 | 7/1992 | Higuchi et al. | 382/323 |
| 5,206,917 | 4/1993 | Veno et al. | 382/288 |
| 5,311,289 | 5/1994 | Yamaoka et al. | 382/144 |
| 5,533,146 | 7/1996 | Iwai | 348/90 |

FOREIGN PATENT DOCUMENTS

| 5-67200 | 3/1993 | Japan . |
| 2259361 | 10/1993 | United Kingdom . |

*Primary Examiner*—Joseph Mancuso
*Assistant Examiner*—Anthony H. Kahng
*Attorney, Agent, or Firm*—Armstrong, Westerman, Hattori, McLeland & Naughton

[57] ABSTRACT

An optical cutting image which has a maximum portion in the X-axis direction on the screen of an image sensing device and which extends in the X-axis direction away from the maximum portion so as to expand in the Y-axis direction is measured by means of plural windows to be set on both side portions of the image as seen in the Y-axis direction, equations to represent the image lines of both side portions, and the like. The position of a front end point of the image is measured. A first window which is oblong in the X-axis direction is set such that the front end point is contained therein. A position of the center of gravity of image inside the first window is measured. Second and third windows which are oblong in the Y-axis direction are set at a position which is backwardly away by a predetermined length from the center of gravity of image inside the first window in the X-axis direction to measure the position of the center of gravity of image inside each of the windows. A reference point which has a predetermined correlation with the centers of gravity of image inside the second and third windows is obtained. The above-mentioned plural windows are respectively set in a predetermined positional relationship with this reference point.

12 Claims, 4 Drawing Sheets

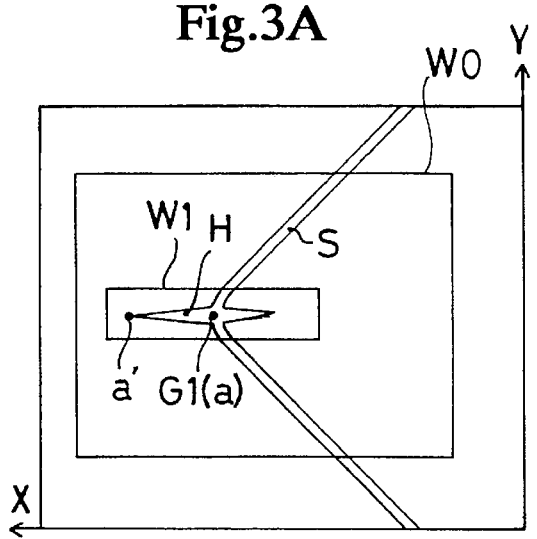
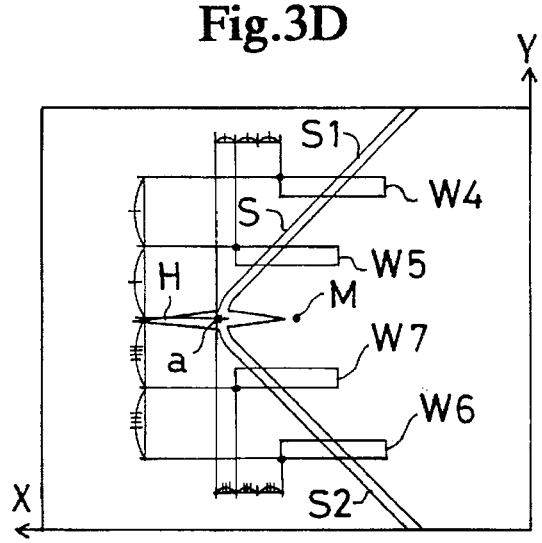
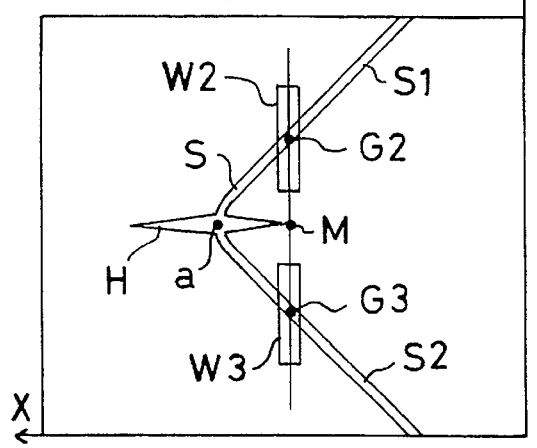
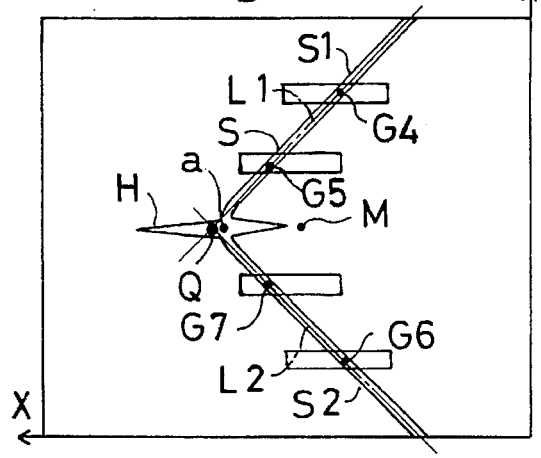
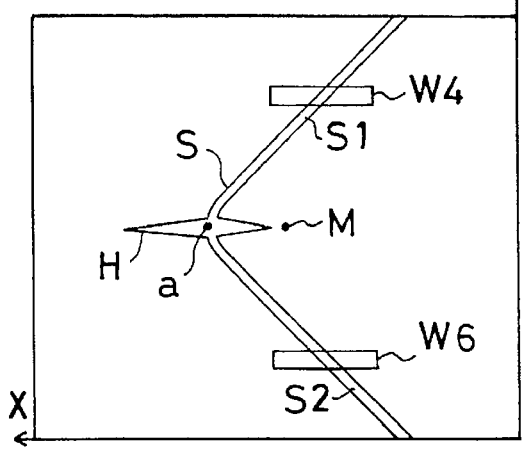

METHOD OF IMAGE PROCESSING IN OPTICAL MEASURING APPARATUS

BACKGROUND OF THE INVENTION

1. Field of the Invention

The present invention relates to a method of image processing in an optical measuring apparatus using an optical cutting method.

2. Description of Related Art

This kind of optical measuring apparatus comprises, as shown in FIG. 1A, a projector 1 which is made up of a slit laser or the like for radiating a slit light on a workpiece A and an image sensing device 2 which is made up of a CCD camera or the like for picturing that optical cutting image or optical cross-sectional image s of the workpiece A which is the image of the slit light formed on the surface of the workpiece A. The projector 1 and the image sensing device 2 are arranged in such a positional relationship that an optical axis of the projector 2 slantingly crosses a light plane of the slit light.

When the workpiece A is of a doglegged shape (i.e., is bent at an angle) in cross section as shown in FIG. 1A, there will appear on a screen of the image sensing device 2 a pictured optical cutting image which has a maximum portion in the direction of one of the coordinate axes on the screen, e.g., in the X-axis direction.

In this case, if the maximum portion is provided with a corner so that a maximum point (or a tip) can be clearly recognized, the shape and the position of the workpiece can be measured based on this maximum point. However, if the maximum portion is round in shape, it is difficult to unambiguously determine the maximum point. In such a case, the following procedure has been considered. Namely, equations of lines to represent those portions of the pictured optical cutting image which are positioned on both sides, in the Y-axis direction, of the maximum portion are calculated. The position of the crossing point of the line on one side and the line on the other side, in the Y-axis direction, of the optical cutting image relative to the maximum portion is obtained from both the equations. The measurement of the workpiece is carried out by making this crossing point to serve as an alternative to the maximum point.

By the way, the pictured optical cutting image becomes a band-like image which has a certain width. Therefore, when the equations of the line on one side and of the line on the other side, in the Y-axis direction, of the image portion are calculated, the following procedure will be followed. Namely, a plurality of windows are set on the image portion, and the position of center of gravity of image in each of these windows is measured to thereby calculate an equation of a curved line or a straight line which passes through these centers of gravity of image. This procedure has, however, the following disadvantage. Namely, when the position of the workpiece changes relative to the optical measuring apparatus, the position of the pictured optical cutting image on the screen also changes. Therefore, if the windows are set in a certain fixed position of the screen, the windows may be placed away from the pictured optical cutting image, or the positions of setting the windows relative to the pictured optical cutting image may deviate from workpiece to workpiece. It is therefore necessary to displace also the position of setting the windows depending on the displacement of the pictured optical cutting image.

As a method of image processing to cope with this kind of requirement, there has hitherto been known one as described in Japanese Published Unexamined Patent Application No. 67200/1993 (corresponding to U.S. Pat. No. 5,311,289).

An explanation will now be made about the method of image processing as described in the above Patent Application based on an example in which a pictured optical cutting image has a maximum portion in the X-axis direction which is one of the coordinate axes of the screen. In this method, before setting predetermined windows respectively in one side portion and in the other side portion in the Y-axis direction relative to the maximum portion of the pictured optical cutting image, the position of a tip, in the X-axis direction, of the pictured optical cutting image is first measured. Then, at a position which is a predetermined length backwardly away from the tip in the X-axis direction, there are set two windows which are elongated in the Y-axis direction. According to this method, each of the windows falls in, or rests on, a predetermined portion of the pictured optical cutting image which extends towards one side and the other side in the Y-axis direction, while moving backwards away from the maximum portion in the X-axis direction. Then, the positions of the centers of gravity in both the windows are measured. A point which has a correlation with both the centers of gravity, e.g., a middle point of a line segment connecting both the centers of gravity is obtained as a reference point. A predetermined window is set respectively in one side portion and in the other side portion, in the Y-axis direction, of the pictured optical cutting image in a predetermined positional relationship with the reference point.

Here, the X-axis and the Y-axis coordinate values of the reference point come to almost accurately represent the displacements in the X-axis direction and in the Y-axis direction on the screen of the pictured optical cutting image. Therefore, even if the pictured optical cutting image may displace on the screen, each of the predetermined windows can be set in the one side portion and in the other side portion, in the Y-axis direction, of the pictured optical cutting image, in a constant positional relationship with these image portions based on the reference point. As a result, it becomes possible to calculate the equation of the image line on each side in the Y-axis direction at a higher accuracy based on the center of gravity in each of the predetermined windows. Based on that crossing point of both the image lines which is obtained by both the equations, the shape and the position of the workpiece can be accurately measured.

In case the workpiece A is a press-formed product (i.e., a product formed by pressing) which is doglegged in cross section as shown in FIG. 1A, the ridgeline of the workpiece A will be subjected to friction or rubbing by metallic molds and will therefore become mirror-finished or become as smooth as a mirror surface. As a result, there sometimes appears a pictured halation image H (or an image formed by halation) which is due to the reflected light from the ridgeline of the workpiece and which extends in the X-axis direction, in addition to the pictured doglegged optical cutting image S which has a maximum portion in the X-axis direction.

In case the workpiece A is S-shaped in cross section as shown in FIG. 2A, there will appear, as shown in FIG. 2B, not only an S-shaped pictured optical cutting image S having a maximum portion and a minimum portion in the X-axis direction, but also pictured reflected images R due to reflected images r of the optical cutting image S as reflected on the crossing planes on the bottom side of the workpiece A. Further, in case the workpiece A is a press-formed product, there may sometimes appear, as shown in FIG. 2C, a pictured halation image H in addition to the pictured reflected images R.

In the above-described conventional method of image processing, when this kind of pictured halation images or pictured reflected images appear, there are cases where the windows can no longer be set appropriately or where the centers of gravity of the pictured reflected images are detected as the centers of gravity of the images inside the windows. As a consequence, the image lines on both sides of the maximum portion of the pictured optical cutting image cannot be correctly calculated.

In view of the above-described points, the present invention has an object of providing a method of image processing in which the image lines on both sides of the maximum portion of the pictured optical cutting image can be correctly calculated even if there appear a halation image or reflected images.

SUMMARY OF THE INVENTION

In order to attain the above and other objects, the present invention is to be applied to a method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion in a direction of one of coordinate axes of the screen of the image sensing device, the method comprising: setting predetermined windows in a plurality of positions of the one side portion of the optical cutting image which is on one side, relative to the maximum portion, in a direction of the other of the coordinate axes of the screen; calculating an equation of an image line which represents said one side portion from a position of center of gravity of image inside each of the windows which are set on said one side portion of the optical cutting image; setting predetermined windows in a plurality of positions of the other side portion of the optical cutting image which lies on the other side, relative to the maximum portion, in the direction of the other of the coordinate axes of the screen; calculating an equation of an image line which represents said the other side portion from a position of center of gravity of image inside each of the windows which are set on said the other side portion of the optical cutting image; obtaining from both the equations a position of a crossing point of the image line on said one side portion and the image line on said the other side portion. A first feature thereof comprises, in order to cope with a halation image, measuring a position of a front end point, in the direction of said one of the coordinate axes, of the image which appears on the screen of the image sensing device; setting a first window which is oblong (in the sense of rectangular) in the direction of said one of the coordinate axes such that the end point is contained therein; measuring a position of a center of gravity of image inside the first window; setting second and third windows which are oblong in the direction of said the other of the coordinate axes at a position which is backwardly away by a predetermined length from the center of gravity of image inside the first window in the direction of said one of the coordinate axes to measure a position of the center of gravity of image inside each of the second and the third windows; obtaining a reference point which has a predetermined correlation with the centers of gravity of image inside the second and the third windows, the above-described predetermined windows being respectively set in a predetermined positional relationship with the reference point.

If one of the above coordinate axes is defined to be an X-axis and the other of the coordinate axes is defined to be a Y-axis, when the halation image appears on the screen, the front end point of the image in the X-axis direction is not a maximum portion of the pictured optical cutting image but is a front end point of the halation image. However, since the halation image extends to both X-axis directions and both side portions become substantially equal to each other in area, if the first window is set as in the present invention, the center of gravity of image inside the first window will coincide with the maximum portion of the pictured optical cutting image. Therefore, if the second and the third windows are set at a position which is backwardly away by a predetermined length in the X-axis direction from the center of gravity of image inside the first window, each of the second and the third windows will rest on the predetermined portion of the pictured optical cutting image which extends towards one side and the other side in the Y-axis direction while moving backwards from the maximum portion in the X-axis direction. Those X-axis and the Y-axis coordinate values of the reference point which are in a predetermined positional relationship with the centers of gravity of image inside the second and the third windows will almost accurately represent the displacement of the pictured optical cutting image in the X-axis direction and in the Y-axis direction on the screen of the optical cutting image.

By thereafter setting each of the predetermined windows for the purpose of calculating the image lines based on this reference point, it is possible to accurately calculate the equation of the image line of one side portion and the equation of the image line of the other side portion in the Y-axis direction of the pictured optical cutting image. The shape and the position of the workpiece can thus be measured at a higher accuracy based on the crossing point of both the image lines to be calculated by both the equations.

If the equations of both the image lines are correctly calculated, the crossing point of both the image lines should be positioned in the neighborhood of the center of gravity of image within the above-described first window. Therefore, it is preferable to compare the position of the crossing point and the position of the center of gravity of image inside the first window to judge whether the image processing is acceptable or not.

A second feature of the present invention comprises, in order to cope with reflected images, selecting images above a predetermined area among independent images which appear on the screen of the image sensing device; measuring a front end point, in the direction of said one of the coordinate axes, of each of the selected images; setting two windows which are oblong in the direction of said the other of the coordinate axes at a position which is backwardly away by a predetermined length from a front endmost point which is defined as a point, among the front end points, that is positioned at a front endmost point in the direction of said one of the coordinate axes to measure a position of a center of gravity of image inside each of the two windows; obtaining a reference point which has a predetermined correlation with the center of gravity of image inside each of the two windows, the predetermined windows being set in a predetermined positional relationship with said reference point; selecting, in each of the predetermined windows, images which are above a predetermined area out of images inside each of the predetermined windows; the calculation of the equations being made by making the center of gravity of image, among the selected images, whose center of gravity is positioned in the front endmost point in the direction of said one of said coordinate axes, as the center of gravity of image inside each of the predetermined windows.

In case the reflected images appear on the screen, the reflected images sometimes become larger in area than the optical cutting image. It follows that, if the image processing is carried out by selecting the image of the largest area in order to remove minute images which appear on the screen due to noises or the like, the reflected images may be selected, resulting in the wrong image processing.

Among the reflected images which are reflected to the crossing (or opposite) surface on the valley side of the workpiece, those which are positioned on the side opposite to the image sensing device will not be pictured by the image sensing device due to the angle of reflection and, therefore, the reflected images will appear in a position which is backwardly away in the X-axis direction relative to the pictured optical cutting image. It follows that, if the images above the predetermined area are selected in order to remove the images due to the noises and if the positions of the front end points, in the X-axis direction, of the selected images are measured, the front endmost point that is positioned in the X-axis direction among these front end points will coincide with the maximum portion of the pictured optical cutting image.

Therefore, if the two windows which are oblong in the Y-axis direction are set at a position which is backwardly away by a predetermined length in the X-axis direction from the front endmost point, each of the windows will rest on that predetermined portion of the pictured optical cutting image which extends in the one direction and in the other direction respectively in the Y-axis direction while moving backwards away from the maximum portion. The X-axis and the Y-axis coordinate values of the reference point which has a predetermined correlation with the center of gravity of image inside the two windows almost accurately represent the displacement in the X-axis and the Y-axis directions of the pictured optical cutting image on the screen.

If each of the predetermined windows for the purpose of calculating the image lines is set based on this reference point, each of the windows rests accurately on the one side portion and the other side portion of the pictured optical cutting image while keeping a predetermined correlation.

In this case, there are cases where, aside from the pictured optical cutting image, reflected images may sometimes be contained as independent images inside each of the windows. Among the images above the predetermined area inside the windows, i.e., among the images except for the images due to noises, the image whose center of gravity of image is positioned in the front endmost point in the X-axis direction will be the pictured optical cutting image. It follows that, according to the present invention, it is possible to select the pictured optical cutting image, among the images inside the windows, and to accurately measure its center of gravity of image.

In this manner, even if there appear reflected images, the equations of the image lines on both side portions in the Y-axis direction of the pictured optical cutting image can accurately be calculated, and the measurement of the workpiece can be carried out at a higher accuracy based on the crossing point of both the image lines.

If the equations of the image lines on both sides in the Y-axis direction of the pictured optical cutting image are correctly calculated, the crossing point of both the image lines should be positioned in the neighborhood of the above-described front endmost point. Therefore, it is preferable to judge whether the image processing is acceptable or not by comparing the position of the crossing point and the position of the front endmost point.

A third feature of the present invention comprises: selecting images above a predetermined area among independent images which appear on the screen of the image sensing device; measuring a front end point, in the direction of said one of the coordinate axes, of each of the selected images; setting a first window which is oblong in the direction of said one of the coordinate axes such that the first window contains therein a front endmost point which is defined as a point, among the front end points, that is positioned in a front endmost point in the direction of said one of the coordinate axes to measure a position of center of gravity of image inside the first window; setting second and third windows which are oblong in the direction of said the other of the coordinate axes, at a position which is backwardly away by a predetermined length from the center of gravity of image inside the first window in the direction of said one of the coordinate axes to measure a position of center of gravity of image inside each of the second and the third windows; obtaining a reference point which has a predetermined correlation with the centers of gravity of image inside the second and third windows; the predetermined windows being respectively set in a predetermined positional relationship with said reference point; selecting, in each of the predetermined windows, images which are above a predetermined area out of images inside each of said predetermined windows; the calculation of the equations being made by making the center of gravity of image, among the selected images, whose center of gravity is positioned in the front endmost point in the direction of said one of the coordinate axes, as the center of gravity of image inside each of the predetermined windows.

This third feature is a combination of the above-described first feature and the second feature. It can therefore cope with both the halation image and the reflected images.

By the way, it is also possible to set each of the above-described predetermined windows for the purpose of calculating the image lines based on those positional data relative to the reference point which are set in advance. In this method, however, it is necessary to keep in memory the positional data of all the predetermined windows. It is further necessary to change these positional data depending on the measuring portions and the kinds of the workpieces, with the result that the work of setting the positional data becomes troublesome. As a solution, it is desired to enable to accurately set a plurality of windows respectively on one side portion and on the other side portion of the pictured optical cutting image with the setting of the positional data relating to as small a number of windows as possible.

In order to meet this kind of requirement, according to a fourth feature of the present invention, a position of an end point which coincides with the maximum portion of the optical cutting image is measured. Two windows which are oblong in the direction of said the other of the coordinate axes are set at a position which is backwardly away by a predetermined length from the end point to measure a position of a center of gravity of image inside each of the two windows. A reference point which has a correlation with both the centers of gravity of image is obtained. A selected window which is selected in advance out of the predetermined windows is set respectively on said one side portion and on said the other side portion of the optical cutting image in a predetermined correlation with the reference point; and setting the remaining ones of said predetermined windows in a position which has a correlation with the position of each of the selected windows and the position of the end point.

According to a fifth feature of the present invention, the method comprises, after having set each of the selected windows as in the above-described fourth feature, measuring a position of the center of gravity of image in each of the selected windows, the remaining ones of the predetermined windows being set in a position which has a predetermined correlation with the position of center of gravity of the image inside each of the selected windows and the position of the end point. In this case, it is preferable to set the remaining windows of the predetermined windows in such a position that a predetermined corner of each of the remaining windows coincides with a predetermined point on a line segment which is formed by parallelly moving, in a direction of said one of the coordinate axes, a line segment connecting the center of gravity of image inside each of the selected windows and the end point.

According to a sixth feature of the present invention, the method comprises, after having obtained the reference point as in the above-described fourth feature, a window which is selected in advance out of the predetermined windows which are to be set on said one side portion of the optical cutting image being set in a predetermined positional relationship with said reference point, the remaining windows out of the predetermined windows which are set on said one side portion of the optical cutting image being set in a position which has a predetermined correlation with the position of the selected window or the position of center of gravity of image inside the selected window and the position of the end point; one of the predetermined windows which are to be set on said the other side portion of the optical cutting image being set at a position which has a predetermined correlation, relative to said one of the coordinate axes, with the position of the selected window and the position of the end point, and which has a predetermined correlation, relative to said other of the coordinate axes, with the position of said selected window and the position of said reference point; the remaining windows out of the predetermined windows which are set on said the other side portion of the optical cutting image being set at a position which has a predetermined correlation with said one window or the position of said center of gravity of image in said one window and with the position of the end point.

If each of the selected windows is set based on the reference point in accordance with the positional date which are set in advance, each of the selected windows will rest, in a predetermined positional relationship, on the one side portion and the other side portion in the Y-axis direction of the pictured optical cutting image relative to the maximum portion. If, as in the above-described fourth feature, the remaining windows out of the predetermined windows are set in a position which has a predetermined correlation with the position of the end point coinciding with the maximum portion and the position of each of the selected windows, e.g., if the remaining windows out of the predetermined windows for the purpose of calculating the image lines are set in an intermediate position between the end point and each of the selected windows, the relative positional accuracy of the windows relative to the pictured optical cutting image can be secured.

In this manner, the image lines on the one side portion and on the other side portion of the pictured optical cutting image can be accurately calculated from the centers of gravity of image in the predetermined windows inclusive of the selected windows. The measurement of the workpiece based on the crossing point of both the image lines can accurately be carried out.

Further, since it is clear that the pictured optical image extends from the maximum portion towards the center of gravity in each of the selected windows, the relative positional accuracy of the windows relative to the pictured optical cutting image can be secured even if, as in the above-described fifth feature, the remaining windows are set at a position which has a predetermined correlation with the position of the end point coinciding with the maximum portion and the position of the center of gravity of image in each of the selected windows.

By the way, the positional relationship, in the Y-axis direction, between the one side portion and the other side portion of the pictured optical cutting image in the Y-axis direction can be obtained from the Y-axis coordinate values of the reference point. Therefore, if the positional data of the selected window for the one side portion of the pictured optical cutting image are once determined, the window which corresponds to the selected window for the other side portion in the above-described fourth and the fifth features can be made to rest on the other side portion of the pictured optical cutting image with a predetermined positional relationship, by setting the window as in the above-described sixth feature, at a position which has a predetermined correlation, relative to the X-axis direction, with the position of the selected window for the one side portion and the position of the end point and which, relative to the Y-axis direction, has a predetermined correlation with the position of the selected windows and the position of the reference point. Thus, according to the sixth feature, the work of setting the positional data can further be simplified by making the selected window for which the positional data are set in advance as one piece on the one side portion.

The end point coinciding with the maximum portion will generally be the front end point, in the X-axis direction, of the image appearing on the screen, but in case a halation image appears, the front end of the halation image will be the front end point in the X-axis direction. Therefore, in order to avoid, like in the above-described first feature, the wrong detection of the end point coinciding with the maximum portion, it is desirous to set the window, which is oblong in the X-axis direction such that the front end point falls therein, after measuring the position of the front end point, in the X-axis direction, of the image appearing on the screen, and then to measure the center of gravity of image inside the window as the end point coinciding with the maximum portion.

If the equations of the image lines on the one side portion and on the other side portion of the pictured optical cutting image are correctly calculated, the crossing point of both the image lines should be positioned in the neighborhood of the end point. It is therefore desirable to judge as to whether the image processing is acceptable or not by comparing the position of the crossing point and the position of the end point.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 3A through 3E are diagrams showing the procedure of image processing of the screen shown in FIG. 1B;

DETAILED DESCRIPTION OF PREFERRED EMBODIMENTS

Figure 1A:
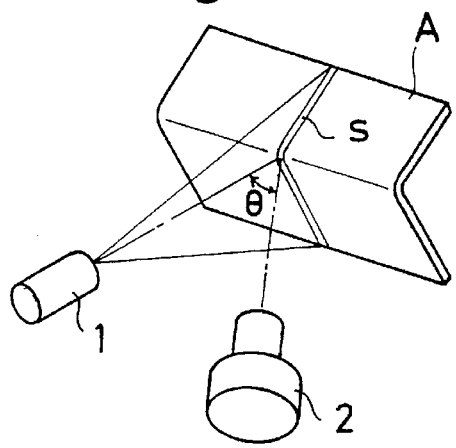
FIG. 1A is a perspective view showing the relationship between an optical measuring apparatus and a workpiece in measuring a doglegged sectional portion of the workpiece.

An explanation will now be made about an embodying example in which the present invention is applied to the image processing in the above-described optical measuring apparatus as shown in FIG. 1A.

Figure 1B:
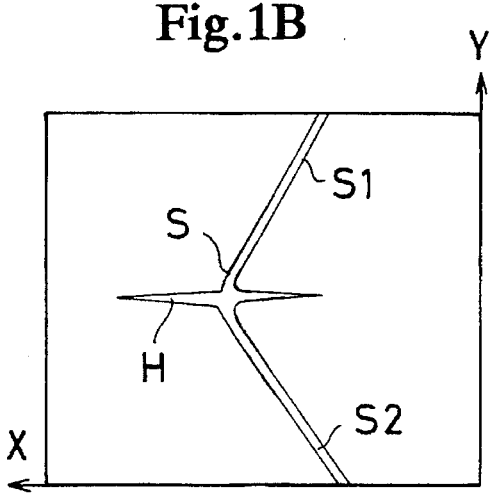
FIG. 1B is a diagram showing the screen of an image sensing device.

On the screen of the image sensing device 2, there appear as shown in FIG. 1B a pictured optical cutting image S which has a maximum portion in the X-axis direction and a halation image H which crosses the maximum portion and extends in the X-axis direction. The image data of the image sensing device 2 are transmitted to an unillustrated image processing device in order to carry out the image processing in the following manner.

First, as shown in FIG. 3A, there is set a stationary window W0 which covers substantially the entire region of the screen. A tip or a front end point (left end point) a' in the X-axis direction of the image inside the window W0 is measured. This point a' is to coincide with the tip of the halation image H.

Then, based on the point a', there is set a first window W1 which is oblong in the X-axis direction so as to cover the point a'. Inside the window W1 there is contained the halation image H. Here, since the halation image H extends to both sides, in the X-axis direction, of the maximum portion such that the area on one side and the area on the other side, in the X-axis direction, of the halation image H become substantially equal to each other. Therefore, the center of gravity G1 of image inside the first window W1 approximately coincides with the maximum portion of the pictured optical cutting image S. The position of the center of gravity G1 of image is then measured as an end point "a" coinciding with the maximum portion.

Next, a vertical pair of second and third windows W2, W3 which are oblong in the Y-axis direction are set, as shown in FIG. 3B, at a position which is backwardly away from the front end point "a" in the X-axis direction, i.e., at a position away to the right by a predetermined length. The position of gravity G2, G3 of image in each of the windows W2, W3 is measured, and there is obtained the position of a reference point M which has a predetermined correlation with both the centers of gravity G2, G3 of the images, e.g., a middle point of a line segment to connect both the centers of gravity G2, G3 of image. Here, the above-described second and the third windows W2, W3 will have been set in a predetermined positional relationship with the maximum portion. Therefore, each of the second and the third windows W2, W3 will rest, in a predetermined relationship, on an upper portion or an upper side portion S1 and a lower portion or a lower side portion S2 of the pictured optical cutting image S which extends upwards and downwards in the Y-axis direction while moving away from, or going backwards to the right from, the maximum portion. It follows that, even if the pictured optical cutting image S may displace in the X-axis direction or the Y-axis direction on the screen due to the change in the relative positional relationship between the optical measuring apparatus and the workpiece A, the relative positional relationship between the reference point M that has a predetermined positional relationship with the centers of gravity G2, G3 of image inside both the windows W2, W3, and the pictured optical cutting image S is maintained constant.

Then, as shown in FIG. 3C, there are set fourth and sixth windows W4, W6 respectively on the upper side portion S1 and on the lower side portion S2 of the pictured optical cutting image S based on the reference point M. In concrete, a distance in the X-axis direction and a distance in the Y-axis direction of a left upper corner of the fourth window W4 and a lower left corner of the sixth window W6 relative to the reference point M are set in advance. The windows W4, W6 are then set according to these set values on the basis of the reference point M. If each of the windows W4, W6 is set in this manner, each of them W4, W6 accurately rests on the upper side portion S1 and on the lower side portion S2 of the pictured optical cutting image S even if the pictured optical cutting image S may displace on the screen.

Thereafter, as shown in FIG. 3D, a fifth window W5 is set at a position which has a predetermined positional relationship with the position of the fourth window W4 and the position of the end point "a". In concrete, the fifth window W5 is set such that the left upper corner of the fifth window W5 coincides with such a position in which the ratio of distance in the Y-axis direction to the end point "a" to the distance in the Y-axis direction to the left upper corner of the fourth window W4 becomes a predetermined value, e.g., 1:1 and also in which the ratio of the distance in the X-axis direction to the end point "a" to the distance in the X-axis direction to the left upper corner of the fourth window W4 becomes a predetermined value, e.g., 1:2. A seventh window W7 is set at a position which has a similar correlation as that described above, relative to the position of the sixth window W6 and the position of the above-described end point "a". According to this arrangement, the fifth window W5 and the seventh window W7 rest on the upper side portion S1 and the lower side portion S2 of the pictured optical cutting image S, while maintaining a relative positional accuracy.

Then, as shown in FIG. 3E, the positions of the centers of gravity G4, G5 of image of the fourth and the fifth windows W4, W5 are measured to calculate the equation of an image line L1 on the upper side portion passing through both the centers of gravity G4, G5 of image. Also, the positions of centers of gravity G6, G7 of image of the sixth and the seventh windows W6, W7 are measured to calculate the equation of an image line L2 on the lower side portion passing through both the centers of gravity G6, G7 of image. From both the equations the position of the crossing point Q is obtained.

In this case, if the equations for the image lines L1, L2 are correctly calculated, the crossing point Q is to be positioned in the neighborhood of the above-described end point "a". Therefore, a determination is made as to whether the crossing point Q falls within a predetermined range which is set based on the end point "a". If it is outside the range, the image processing is judged to be unacceptable and a display is made to that effect.

Finally, coordinate values of the crossing point Q on the slit light plane is calculated according to the analytic principle of optical cutting from the coordinate values of the crossing point Q on the screen. Further, in order to correct the error due to the distortion of the lens system of the image sensing device 2, the deviation in relative positional relationship between the projector 1 and the image sensing device 2, or the like, the coordinate values of the crossing point Q on the slit light plane are corrected according to a correction formula to be obtained in advance by a calibration work of the optical measuring apparatus, and the shape and the position of the workpiece A are then measured.

If the workpiece A displaces in the direction of the optical axis of the slit light, the pictured optical cutting image S comes to displace on the screen in the X-axis direction and, also, the rate of magnification of the image S comes to vary. Therefore, it is desired to change the positions and the sizes of the fourth through the seventh windows W4–W7 depending on the rate of magnification of the image S so that the windows can be set at predetermined positions of the image S even if the image S is magnified or reduced. Here, let us define the rate of magnification to be K, the distance between the image sensing device 2 and the crossing point of the optical axis of the image sensing device 2 with the slit light plane to be D, the angle of the optical axis of the image sensing device 2 to the slit light plane to be θ, and the amount of X-axis displacement relative to the regular or ordinary position of the image S to be dX. Then, the following formula can be established.

$$K=1+(dX/D)\cot\theta$$

Therefore, the rate of magnification K can be calculated from the above formula by obtaining the amount of X-axis displacement of the pictured optical cutting image S from the position of the above-described end point "a". The distances of the fourth and the sixth windows W4, W6 in the Y-axis direction relative to the reference point M can be made to be the ones obtained by multiplying the set values by the value K. If the sizes of the fourth through the seventh windows W4–W7 are also changed according to the rate of magnification K, it becomes possible to set each of the windows at a predetermined position of the pictured optical cutting image S even if the rate of magnification may vary.

Figure 4:
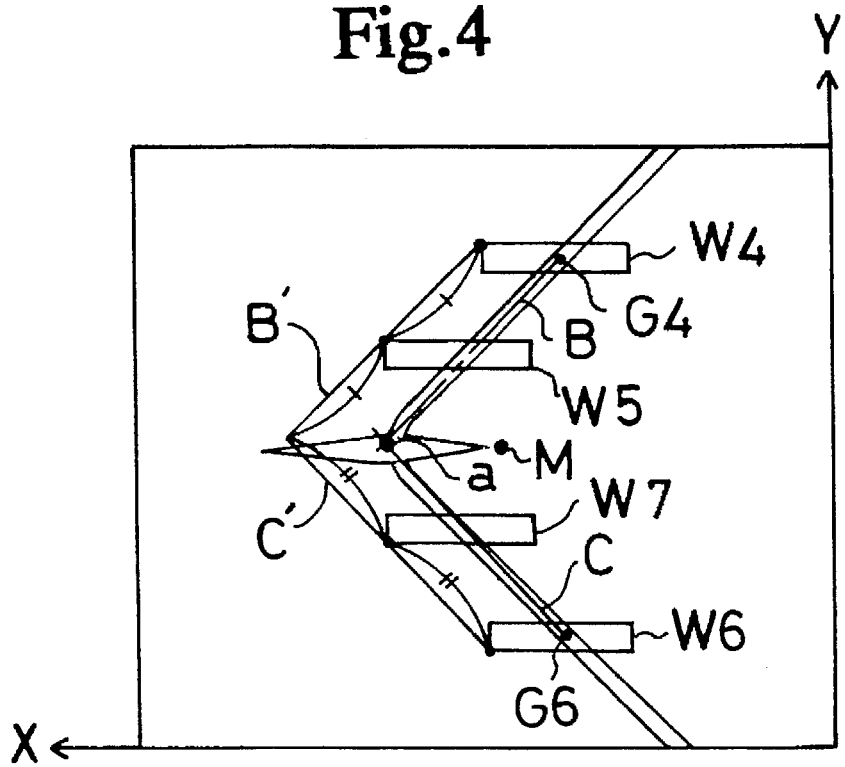
FIG. 4 is a diagram showing the method of setting remaining windows among predetermined windows.

In the above-described example, the fifth window W5 and the seventh window W7 are set at positions which have a predetermined correlation with the positions of the fourth window W4 and the sixth window W6 as well as with the position of the end point "a". They may also be set, as shown in FIG. 4, at positions which have a predetermined correlation with the positions of the centers of gravity G4, G6 of image inside the fourth and the sixth windows W4, W6 as well as the end point "a". In the example shown in FIG. 4, the fifth window W5 is set such that the left upper corner of the fifth window W5 coincides with a middle point of a parallel line segment B' which is formed by a parallel movement forwards (to the left), in the X-axis direction, of a line segment B which connects the center of gravity G4 inside the fourth window W4 and the end point "a". Further, the seventh window W7 is set such that the left lower corner of the seventh window W7 coincides with a middle point of a parallel line segment C' which is formed by a parallel movement forwards, in the X-axis direction, of a line segment C which connects the center of gravity G6 of image inside the sixth window W6 and the end point "a".

Furthermore, in the above example, an arrangement has been made such that the fourth window W4 and the sixth window W6 are set according to positional data, which are determined in advance, based on the reference point M. It is however also possible to determine in advance only the positional data of one of the fourth and the sixth windows W4, W6 and to set the other of the windows based on the positions of the three items, i.e., one of the windows, the end point "a" and the reference point M.

Figure 5:
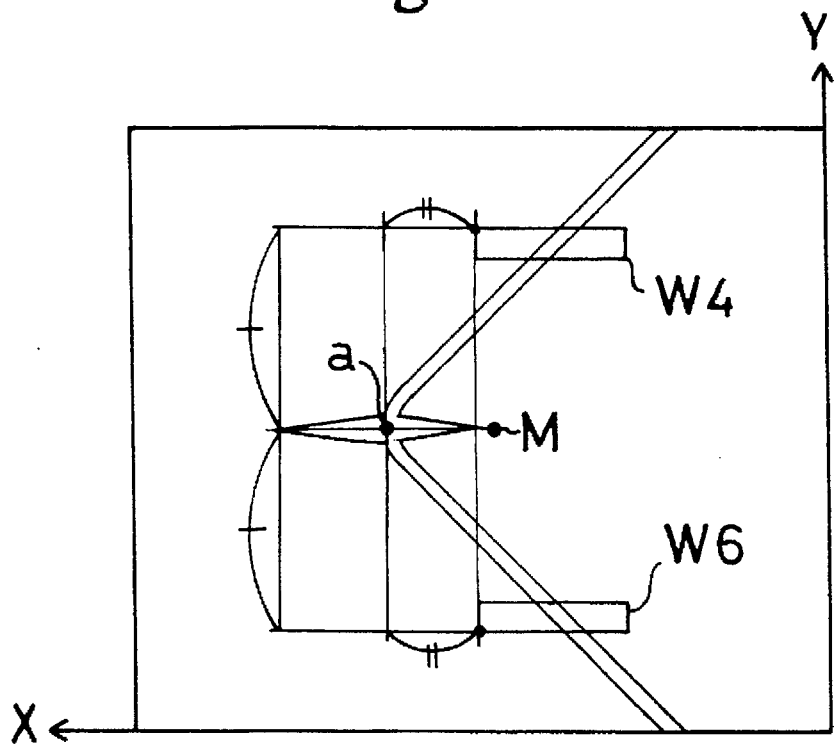
FIG. 5 is a diagram showing the method of setting a window for the other side portion of the image based on the selected window for the one side portion of the image.

This will now be explained in more detail with reference to FIG. 5. In this example, the positional data of the fourth window W4 are determined in advance. After the fourth window W4 has been set based on the reference point M, the sixth window W6 is set such that the left lower corner thereof coincides with a position in which the X-axis distance from the end point "a" becomes equal to the X-axis distance from the end point "a" in the left upper corner of the fourth window W4 and, also, in which the Y-axis distance from the reference point M downwards becomes equal to the Y-axis distance from the left upper corner of the fourth window W4. Here, since the reference point M is positioned in the middle, in the Y-axis direction, between the upper side portion S1 and the lower side portion S2 of the pictured optical cutting image S, even if the sixth window W6 is set as described above, the sixth window W6 rests on the lower side portion S2 while maintaining a relative positional accuracy.

The fifth and the seventh windows W5, W7 may be set according to the procedure as shown in FIGS. 3C and 4.

Figure 2A:
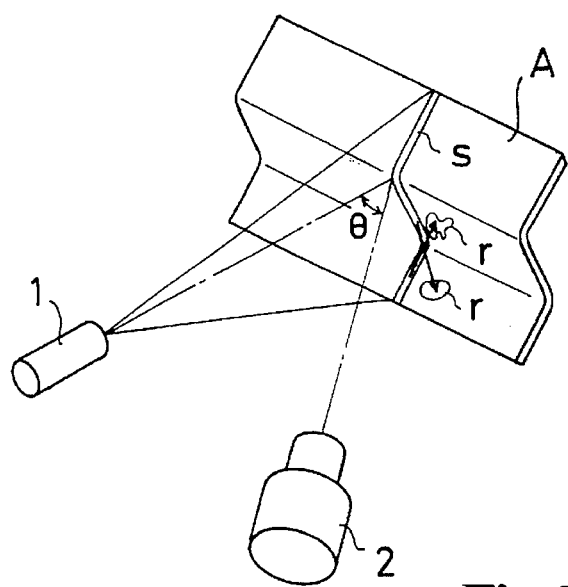
FIG. 2A is a perspective view showing the relationship between the optical measuring apparatus and a workpiece in measuring an S-shaped sectional portion of the workpiece.

Next, an explanation will be made about the image processing when the workpiece A of S-shape in cross section as shown in FIG. 2A is measured in the optical measuring apparatus.

Figure 2B:
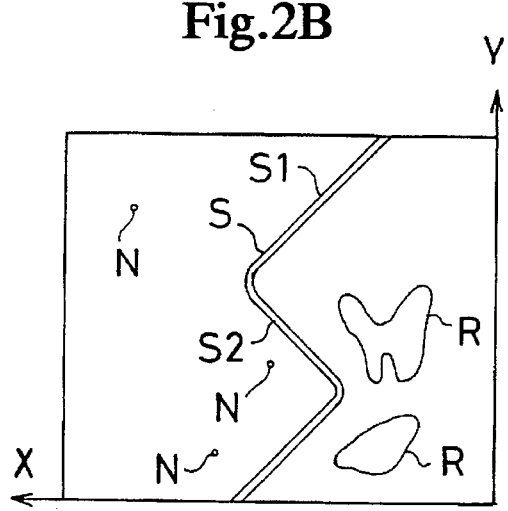
FIG. 2B is a diagram showing that screen of the image sensing device on which appear reflected images.
Figure 2C:
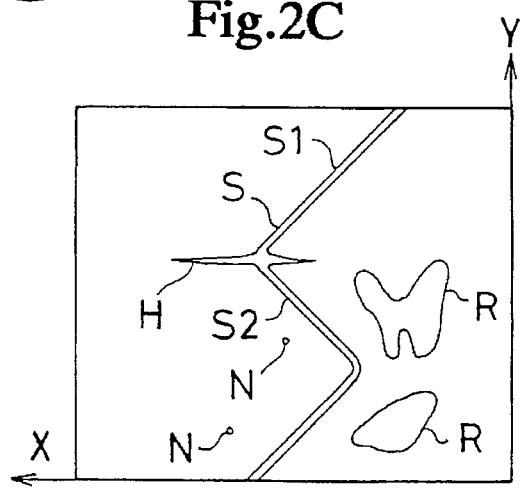
FIG. 2C is a diagram showing that screen of the image sensing device on which appear reflected images and a halation image.

It is assumed that there appear on the screen of the image sensing device 2, as shown in FIG. 2C, an S-shaped pictured optical cutting image S which has a maximum portion and a minimum portion in the X-axis direction, a halation image H which extends in the X-axis direction by crossing the maximum portion, two pieces of upper and lower reflected images R in a position which is backwardly away in the X-axis direction (i.e., to the right hand side) relative to the pictured optical cutting image S, and a plurality of minute noise images N.

Figure 6A:
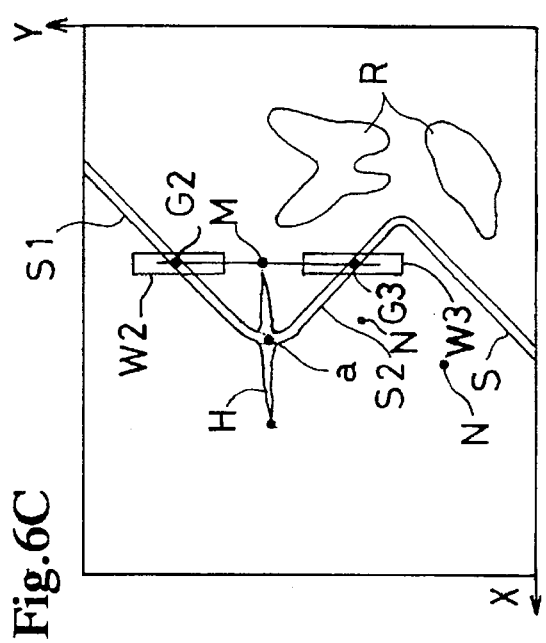
FIGS. 6A through 6D are diagrams showing the procedure of image processing the screen shown in FIG. 2C.

In carrying out the image processing, a stationary window W0 which covers substantially the whole area of the screen is set first on the screen as shown in FIG. 6A. Among the independent images inside the window W0, those above a predetermined area which is set above the areas of the noise images N are selected. In this case, the selected images are a combined image of the pictured optical cutting image S and the halation image H, and two pieces of reflected images R. Then, the positions of the front end points a1, a2, a3 in the X-axis direction of each of these images are measured. Among the front end points the one that is located in the front endmost position in the X-axis direction is determined as the front endmost point a'. Here, since the reflected images R appear only on the right side, in the X-axis direction, of the optical cutting image S, this front endmost point a' coincides with the front end point of the halation image H.

Figure 6B:
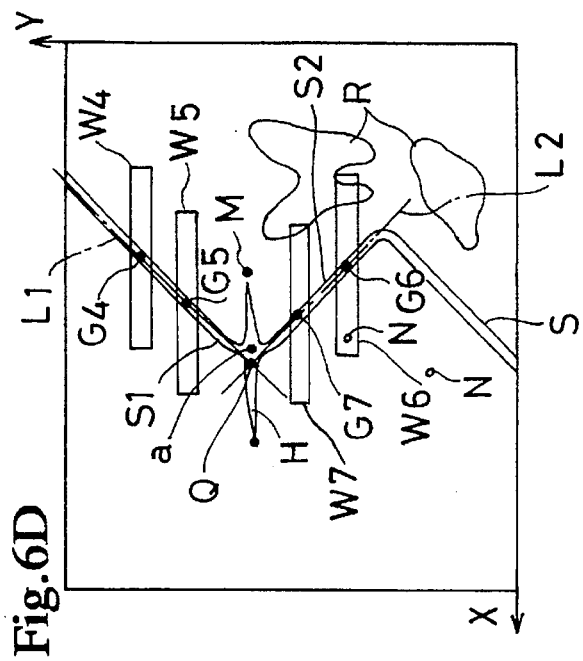

Then, on the basis of this front endmost point a', a first window W1 which is oblong in the X-axis direction is set as shown in FIG. 6B such that the front endmost point a' is contained therein. The position of the center of gravity G1 inside the first window W1 is measured as an end point "a" which coincides with the maximum portion.

Figure 6C:
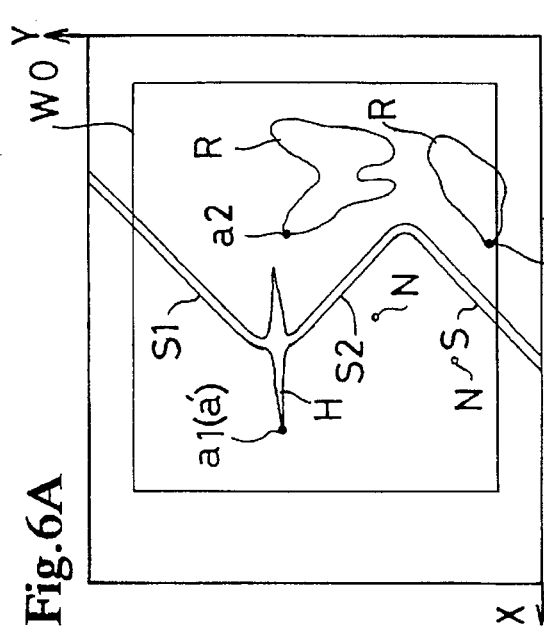

Next, a pair of upper and lower second and third windows W2, W3 which are oblong in the Y-axis direction are set as shown in FIG. 6C at a position which is backwardly away from the end point "a" by a predetermined length, i.e., at a position away to the right by a predetermined length. Then, the positions of the centers of gravity G2, G3 of image of both the windows W2, W3 are measured, and there is obtained the position of a reference point M which has a predetermined correlation with both the centers of gravity G2, G3 of image, e.g., a middle point of a line segment connecting both the centers of gravity G2, G3 of image.

Figure 6D:
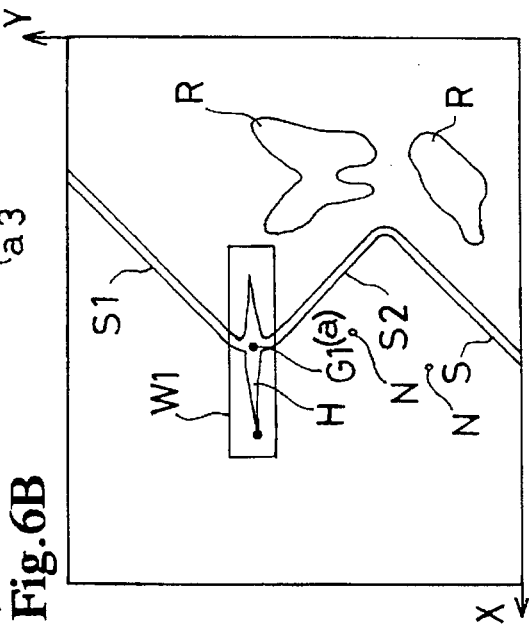

Thereafter, based on the reference point M, there are set, as shown in FIG. 6D, fourth and fifth windows W4, W5 as well as sixth and seventh windows W6, W7 respectively on the upper side portion S1 and the lower side portion S2 of the pictured optical cutting image S. In concrete, there are set in advance a distance in the X-axis direction and a distance in the Y-axis direction between, e.g., the left upper corner of the each of the windows Wn (n=4 through 7) and the reference point M, as well as the length in the X-axis direction and in the Y-axis direction of each of the windows Wn. Based on the reference point M each of the windows Wn is set in accordance with the set values or each of the windows Wn is set in a similar procedure as is used in the windows W4 through W7 shown in FIGS. 3 through 5. If each of the windows Wn is set in this manner, each of the windows Wn accurately rests on the upper side portion S1 and the lower side portion S2 of the pictured optical cutting image S while maintaining a predetermined correlation, even if the pictured optical cutting image S may displace on the screen.

There are cases where reflected images R or noise images N appear inside the windows Wn. In order to avoid the possibility of wrongly measuring the center of gravity of an image which is different from the pictured optical cutting image S, which shall be made the object of measurement, as the center of gravity of the image of the pictured optical cutting image S, the center of gravity of image within each of the windows Wn is measured in the following manner. First, among the independent images inside the window, those images above a predetermined area are selected. This predetermined area is set to ½, preferably ⅔, of the average value of the pictured optical cutting images S inside the windows Wn. The noise images N contained inside the windows Wn can thus be surely removed. However, at this stage, reflected images R may sometimes be left by being selected together with the pictured optical cutting images S in the sixth and the seventh windows W6, W7. Therefore, by taking advantage of the characteristics that the pictured optical cutting image S is positioned in the forward (left) direction in the X-axis direction as compared with the reflected images R, a judgement is made that, among the selected images, the one that is present at the front endmost point in the X-axis direction is the pictured optical cutting image S. The position of the center of gravity Gn of image is thus measured. It is also acceptable to respectively measure the center of gravity of image of each selected image and then to judge, among the centers of gravity, that the one at the front endmost point in the X-axis direction is the center of gravity Gn of the pictured optical cutting image. Anyway, it is acceptable as long as that position of center of gravity of image which is positioned in the front endmost point in the X-axis direction can be measured, among the selected images, as the position of center of gravity Gn of the image.

Then, an equation of that image line L1 on the upper side portion S1 which passes through the centers of gravity G4, G5 of image in both the fourth and the fifth windows W4, W5 is calculated. Also, an equation of that image line L2 on the lower side portion S2 which passes through the centers of gravity G6, G7 of image in both the sixth and the seventh windows W6, W7 is calculated. From both the equations the position of the crossing point Q of both the image lines L1, L2 is obtained.

In this case, if the equations of both the lines L1, L2 are correctly calculated, the crossing point Q will be positioned in the neighborhood of that center of gravity G1 of image which is the above-described end point "a". Therefore, a determination is made as to whether the crossing point Q falls within a predetermined range which is based on the center of gravity G1 of image. If it is outside the range, a judgement is made that the image processing is unacceptable and a display is made to that effect.

Finally, coordinate values of the crossing point Q on the slit light plane are calculated from the coordinate values on the screen of the crossing point Q according to the analytic principle of the optical cutting. Further, in order to correct an error due to the distortion of the lens system of the image sensing device 2, the deviation in the relative positional relationship between the projector 1 and the image sensing device 2, or the like, the coordinate values of the crossing point Q are corrected according to a correction equation to be obtained in advance by a calibration work of the optical measuring apparatus, and then the shape and the position of the workpiece A are measured.

In case, as shown in FIG. 2B, where a halation image does not appear, among those front end points of each of the images in the X-axis direction which are selected in the stationary window W0 and which have an area above a predetermined area, the position of the front endmost point that is positioned in the front endmost point in the X-axis direction is measured as an end point "a". Thereafter, the coordinates of the crossing point Q can be obtained in the similar procedure as shown in FIGS. 6C and 6D.

It is readily apparent that the above-described method of image processing meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion in a direction of one of coordinate axes of the screen of the image sensing device, said method comprising:

setting predetermined windows in a plurality of positions of that one side portion of the optical cutting image which lies on one side, relative to said maximum portion, in a direction of the other of the coordinate axes of the screen;

calculating an equation of an image line which represents said one side portion from a position of center of gravity of image inside each of said windows which are set on said one side portion of the optical cutting image;

setting predetermined windows in a plurality of positions of that the other side portion of the optical cutting image which lies on the other side, relative to said maximum portion, in the direction of the other of the coordinate axes of the screen;

calculating an equation of an image line which represents said the other side portion from a position of center of gravity of image inside each of said windows which are set on said the other side portion of the optical cutting image;

obtaining from both said equations a position of a crossing point of the image line on said one side portion and the image line on said the other side portion;

wherein said method further comprises:

measuring a position of a front end point, in the direction of said one of the coordinate axes, of the image which appears on the screen of the image sensing device;

setting a first window which is oblong in the direction of said one of the coordinate axes such that said front end point is contained therein;

measuring a position of a center of gravity of image inside said first window;

setting second and third windows which are oblong in the direction of said the other of the coordinate axes at a position which is backwardly away by a predetermined length from said center of gravity of image inside said first window in the direction of said one of the coordinate axes to measure a position of said center of gravity of image inside each of said second and third windows;

obtaining a reference point which has a predetermined correlation with said centers of gravity of image inside said second and third windows, said predetermined windows being respectively set in a predetermined positional relationship with said reference point.

2. A method of image processing in an optical measuring apparatus according to claim 1, wherein a judgement is made as to whether the image processing is acceptable or not by comparing the position of said crossing point and the position of said center of gravity of image inside said first window.

3. A method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion and a minimum portion in a direction of one of coordinate axes of the screen of the image sensing device, said method comprising:

setting predetermined windows in a plurality of positions of that one side portion of the optical cutting image which extends towards one side of the other of the coordinate axes of the screen while moving backwards away from said maximum portion in the direction of said one of the coordinate axes;

calculating an equation of an image which represents said one side portion from a position of center of gravity of image inside each of said windows which are set in said one side portion of the optical cutting image;

setting predetermined windows in a plurality of positions of that the other side portion of the optical cutting image which extends towards the other side of the coordinate axes while moving backwards away from said maximum portion in the direction of said one of the coordinate axes;

calculating an equation of an image line which represents said the other side portion from a position of center of gravity of image inside each of said windows which are set on said the other side portion of the optical cutting image;

obtaining from both said equations a position of a crossing point of the image line on said one side portion and the image line on said the other side portion;

wherein said method further comprises:

selecting images above a predetermined area among independent images which appear on the screen of the image sensing device;

measuring a front end point, in the direction of said one of the coordinate axes, of each of the selected images;

setting two windows which are oblong in the direction of said the other of the coordinate axes at a position which is backwardly away by a predetermined length from a front endmost point which is defined as a point, among said front end points, that is positioned at a front endmost point in the direction of said one of the coordinate axes to measure a position of a center of gravity of image inside each of said two windows;

obtaining a reference point which has a predetermined correlation with said center of gravity of image inside each of said two windows, said predetermined windows being set in a predetermined positional relationship with said reference point;

selecting, in each of said predetermined windows, images which are above a predetermined area out of images inside each of said predetermined windows, said calculation of said equations being made by making the center of gravity of image, among the selected images, whose center of gravity is positioned in the front endmost point in the direction of said one of the coordinate axes, as the center of gravity of image inside each of said predetermined windows.

4. A method of image processing in an optical measuring apparatus according to claim 3, wherein a determination is made as to whether the image processing is acceptable or not by comparing the position of said crossing point and the position of said front endmost point.

5. A method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion and a minimum portion in a direction of one of coordinate axes of the screen of the image sensing device, said method comprising:

setting predetermined windows in a plurality of positions of that one side portion of the optical cutting image which extends towards one side of the other of the coordinate axes of the screen while moving backwards away from said maximum portion in the direction of said one of the coordinate axes;

calculating an equation of an image line which represents said one side portion from a position of center of gravity of image inside each of said windows which are set on said one side portion of the optical cutting image;

setting predetermined windows in a plurality of positions of that the other side portion of the optical cutting image which extends towards the other side of the coordinate axes while moving backwards away from said maximum portion in the direction of said one of the coordinate axes;

calculating an equation of an image line which represents said the other side portion from a position of center of gravity of image inside each of said windows which are set on said the other side portion of the optical cutting image;

obtaining from both said equations a position of a crossing point of the image line on said one side portion and the image line on said the other side portion;

wherein said method further comprises:
selecting images above a predetermined area among independent images which appear on the screen of the image sensing device;
measuring a front end point, in the direction of said one of said coordinate axes, of each of the selected images;
setting a first window which is oblong in the direction of said one of the coordinate axes such that said first window contains therein a front endmost point which is defined as a point, among said front end points, that is positioned in a front endmost point in the direction of said one of the coordinate axes to measure a position of center of gravity of image inside said first window;
setting second and third windows which are oblong in the direction of said the other of the coordinate axes, at a position which is backwardly away by a predetermined length from said center of gravity of image in the direction of said one of the coordinate axes to measure a position of center of gravity of image inside each of said second and third windows;
obtaining a reference point which has a predetermined correlation with said center of gravity of image inside said second and third windows, said predetermined windows being respectively set in a predetermined positional relationship with said reference point;
selecting, in each of said predetermined windows, images which are above a predetermined area out of images inside each of said predetermined windows, said calculation of said equations being made by making the center of gravity of image, among the selected images, whose center of gravity is positioned in the front endmost point in the direction of said one of the coordinate axes, as the center of gravity of image inside each of said predetermined windows.

6. A method of image processing in an optical measuring apparatus according to claim 5, wherein a determination is made as to whether the image processing is acceptable or not by comparing the position of said crossing point and the position of said center of gravity of image inside said first window.

7. A method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion in a direction of one of coordinate axes of the screen of the image sensing device, said method comprising:
setting predetermined windows in a plurality of positions of that one side portion of the optical cutting image which is positioned on one side, relative to said maximum portion, in a direction of the other of the coordinate axes of the screen;
calculating an equation of an image line which represents said one side portion from a position of center of gravity of image inside each of said windows which are set on said one side portion of the optical cutting image;
setting predetermined windows in a plurality of positions of that the other side portion of the optical cutting image which is positioned on the other side, relative to said maximum portion, in the direction of the other of the coordinate axes of the screen;
calculating an equation of an image line which represents said the other side portion from a position of the center of gravity of image inside each of said windows which are set on said the other side portion of the optical cutting image;
obtaining from both said equations a position of a crossing point of the image line on said one side portion and the image line on said the other side portion;
wherein said method further comprises:
measuring a position of an end point which coincides with said maximum portion of said optical cutting image;
setting two windows which are oblong in the direction of said the other of the coordinate axes at a position which is backwardly away by a predetermined length from said end point to measure a position of the center of gravity of image inside each of said two windows;
obtaining a reference point which has a correlation with said centers of gravity of image inside said two windows, a selected window which is selected in advance out of said predetermined windows being set respectively on said one side portion and on said the other side portion of said optical cutting image in a predetermined correlation with said reference point, the remaining ones of said predetermined windows being set in a position which has a correlation with the position of each of said selected windows and the position of said end point.

8. A method of image processing in an optical measuring apparatus which comprises a projector for radiating a slit light on a workpiece and an image sensing device for picturing an optical cutting image drawn by the slit light radiated on the workpiece, the optical cutting image on a screen of the image Sensing device having a maximum portion in a direction of one of coordinate axes of the screen of the image sensing device, said method comprising:
setting predetermined windows in a plurality of positions of that one side portion of the optical cutting image which is positioned on one side, relative to said 5 maximum portion, in a direction of the other of the coordinate axes of the screen;
calculating an equation of an image line which represents said one side portion from a position of center of gravity of image inside each of said windows which are set on said one side portion of the optical cutting image;
setting predetermined windows in a plurality of positions of that the other side portion of the optical cutting image which is positioned on the other side, relative to said maximum portion, in the direction of the other of the coordinate axes of the screen;
calculating an equation of an image line which represents said the other side portion from a position of center of gravity of image inside each of said windows which are set on said the other side portion of the optical cutting image;
obtaining from both said equations a position of a crossing point of the image line on said one side portion and the image line on said the other side portion;
wherein said method further comprises:
measuring a position of an end point which coincides with said maximum portion of the optical cutting image;
setting two windows which are oblong in the direction of said the other of the coordinate axes at a position which is backwardly away by a predetermined length from said end point in the direction of said one of said coordinate axes to measure a position of the center of gravity of image inside each of said two windows;

obtaining a reference point which has a correlation with said centers of gravity of image inside said two windows, a selected window which is selected in advance out of said predetermined windows being set respectively on said one side portion and on said the other side portion of the optical cutting image in a predetermined positional relationship with said reference point;

measuring a position of the center of gravity of image in each of said selected windows, the remaining ones of said predetermined windows being set in a position which has a predetermined correlation with the position of center of gravity of the image inside each of said selected windows and the position of said end point.

9. A method of image processing in an optical measuring apparatus according to claim 8, wherein said remaining ones of said predetermined windows are set in such a position that a predetermined corner of each of said remaining windows coincides with a predetermined point on a line segment which is formed by parallelly moving, in a direction of said one of said coordinate axes, a line segment connecting said center of gravity of image inside each of said selected windows and said end point.

10. A method of image processing in an optical measuring apparatus which comprises a projector for radiating a slit light on a workpiece and an image sensing device for picturing an optical cutting image drawn by the slit light radiated on the workpiece, the optical cutting image on a screen of the image sensing device having a maximum portion in a direction of one of coordinate axes of the screen of the image sensing device, said method comprising:

setting predetermined windows in a plurality of positions of that one side portion of the optical cutting image which is positioned on one side, relative to said maximum portion, in a direction of the other of the coordinate axes of the screen;

calculating an equation of an image line which represents said one side portion from a position of center of gravity of image inside each of said windows which are set on said one side portion of the optical cutting image;

setting predetermined windows in a plurality of positions of that the other side portion of the optical cutting image which is positioned on the other side, relative to said maximum portion, in the direction of the other of the coordinate axes of the screen;

calculating an equation of an image line which represents said the other side portion from a position of center of gravity of image inside each of said windows which are set on said the other side portion of the optical cutting image;

obtaining from both said equations a position of a crossing point of the image line on said one side portion and the image line on said the other side portion;

wherein said method further comprises:

measuring a position of an end point which coincides with said maximum portion of the optical cutting image;

setting two windows which are oblong in the direction of said the other of the coordinate axes at a position which is backwardly away by a predetermined length from said end point in the direction of said one of the coordinate axes to measure a position of the center of gravity of image in each of said two windows;

obtaining a reference point which has a correlation with said centers of gravity of image inside said two windows;

a window which is selected in advance out of said predetermined windows which are to be set on said one side portion of the optical cutting image being set in a predetermined positional relationship with said reference point;

said remaining windows out of said predetermined windows which are set on said one side portion of the optical cutting image being set in a position which has a predetermined correlation with the position of said selected window or the position of center of gravity of image inside said selected window and the position of said end point;

one of said predetermined windows which are to be set on said the other side portion of the optical cutting image being set at a position which has a predetermined correlation, relative to said one of said coordinate axes, with the position of said selected window and the position of said end point, and which has a predetermined correlation, relative to said the other of the coordinate axes, with the position of said selected window and the position of said reference point;

said remaining windows out of said predetermined windows which are set on said the other side portion of the optical cutting image being set at a position which has a predetermined correlation with said one window or the position of said center of gravity of image in said one window and with the position of said end point.

11. A method of image processing in an optical measuring apparatus according to any one of claims 7 through 10, further comprising:

measuring the position of a front end point, in the direction of said one of the coordinate axes, of the image which appears on the screen of the image sensing device;

setting a window which is oblong in the direction of said one of the coordinate axes, such that the front end point is contained therein; and measuring the position of the center of gravity of image inside said window as said end point.

12. A method of image processing in an optical measuring apparatus according to any one of claims 7 through 10, wherein a Judgement is made as to whether the image processing is acceptable or not by comparing the position of said crossing point and the position of said end point.

* * * * *

UNITED STATES PATENT AND TRADEMARK OFFICE
CERTIFICATE OF CORRECTION

PATENT NO.:    5,633,950
DATED     :    May 27, 1997
INVENTOR(S):   Naoji YAMAOKA and Kohi ODA It is certified that errors appear in the above-identified patent and that said Letters Patent is hereby corrected as shown below:

At column 18, line 33 (claim 8, line 6), delete "Sensing" and insert therefor --sensing--.

At column 18, line 38 (claim 8, line 11), delete the number "5".

At column 20, line 53 (claim 12, line 3), delete "Judgement" and insert therefor --judgement--.

Signed and Sealed this

Third Day of March, 1998

Attest:

BRUCE LEHMAN

*Attesting Officer*    Commissioner of Patents and Trademarks